Patented June 29, 1926.

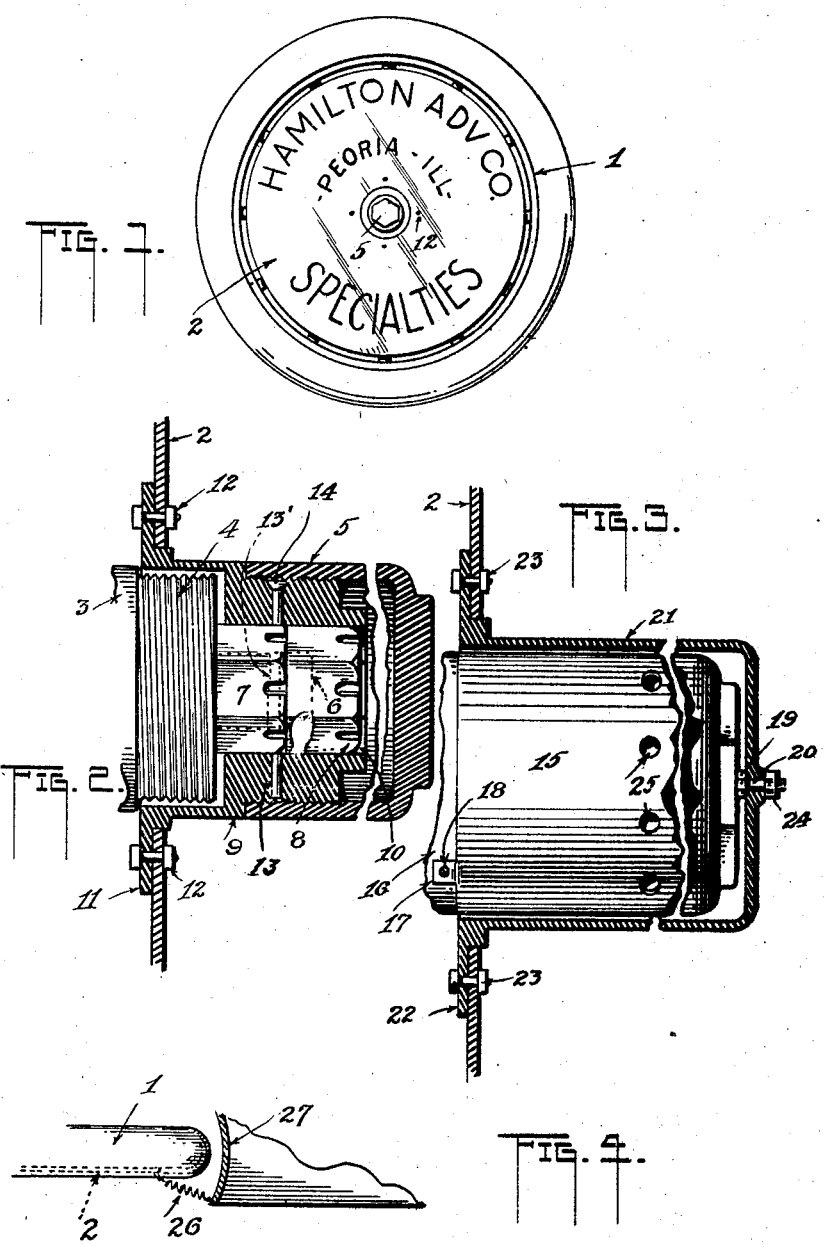

1,590,189

UNITED STATES PATENT OFFICE.

HARRY A. HAMILTON, OF PEORIA, ILLINOIS.

ADVERTISING-DISPLAY DEVICE FOR VEHICLE WHEELS.

Application filed April 18, 1924. Serial No. 707,358.

This invention relates to advertising display devices, pertaining more particularly to means for this purpose mounted on the ground wheels or supporting wheels of an automobile.

The object of the invention is to provide a carrier for an advertising display the mounting for which will be substantial in nature, very reliable and of long life, yet simple in its appointments.

In the appended drawing forming part hereof,

Figure 1 is a side elevation of the wheel of an automobile for example, showing a disc or plate mounted thereon for receiving display matter.

Figure 2 is a front elevation of the hub of an automobile wheel showing in longitudinal section parts for attachment to the axle which carries a disc or plate shown in Figure 1.

Figure 3 is a front elevation of a rear wheel-hub showing in longitudinal section parts also for carrying a disc or plate.

Figure 4 is a plan of part of a rear wheel together with a fender, shown in section, with which my device in one of its forms is associated.

The purpose of my invention, as in others of its type, is that such a mounting may be provided for a disc or plate that said disc or plate will retain a fixed position with respect to the wheel and hub while said wheel is in rotation and such also that both the front and rear wheels may be equipped.

In Figure 1 of the drawing, 1 designates a wheel and its tire, while 2 is a disc or plate of suitable material such as fiber, for example, mounted within the wheel-rim.

The means for mounting the disc at the front wheel is shown in Figure 2 wherein 3 is a part of the wheel-hub threaded in the usual manner at 4 for receiving the usual hub-cap. However, for the purpose of my invention said cap is removed from the hub exposing the axle 6 and its retaining nut 7 for the wheel. Preferably, there is screwed upon the projecting end of the axle outside the nut 7 an additional nut 8 corresponding with the said nut 7 both in form and position. A member 9 provided with an opening 10 extending longitudinally therethrough is fitted upon the said nuts, said opening corresponding in form to the latter so as to be non-rotatable thereon. Said member is extended toward the wheel-hub and is cupped as shown to enclose and cover the threaded portion 4 and terminates in a flange 11 whose outer face is parallel to the plane of the wheel, not shown in Figure 2, said flange having secured upon it the described disc or plate 2 as by bolts 12 for example.

In addition, the member is reduced in diameter at its outer end where it encloses the nuts 7 and 8, being a mere preference, and is threaded to receive the hub-cap 5. However in order to retain the member 9 in position a hole 13 is bored through it to register with the usual cotter-pin hole 13' of the axle 6 and a pin 14 of a length to extend through the said member and axle is inserted and engages the castellated nut 7 preventing it from turning on the axle with said member 9, after which the cap 5 is screwed to position.

It is thus seen that since the whole structure described is affixed to the axle it is stationary while the wheel-hub is free to turn. The use of the nut, it may be stated, is merely to, in effect, extend the axle giving the member 9 a long staunch bearing thereon and providing, also, a greater threaded area for the said cap 5.

In Figures 3 and 4 a slightly different arrangement for a rear wheel is made use of and at which place the rear axle, of course, revolves. The hub-cap is denoted at 15 and preferably it is secured against movement relatively to the hub 16 by any suitable means such as a lug or ear 17, for example, which extends therefrom to overlie the hub, and a screw 18 extending through it into the hub secures the cap in position. At its outer end the cap has an extension or stud 20 axially in line with the axis of rotation of the hub which provides a support for a cap 21. This cap as may be seen encloses the hub-cap 15 and at its inner end has a flange 22 corresponding to the flange 11 of Figure 1 and receives the said disc or plate 2, as in the first instance, bolts 23 being employed to secure the flange and disc relatively. The opposite or closed end of the cap 21 is provided with a bore at the axis thereof to take over the said stud 20 in a free running manner, there being a retaining nut or washer 24 for holding the cap in place.

The bore of the cap 21 may be but slightly larger than the diameter of the hub-cap 15 and preferably the cavity between the two is filled with grease for lubricating purposes and there may be openings 25 in the walls of the last named cap through which grease may outwardly flow.

None but a slight control of the cap 21 to prevent its rolling with the wheel is necessary and for this purpose there is used a light coil spring 26 connected at its ends to the periphery of the disc 2, Figure 4, and to the fender 27. This arrangement extends horizontally from and holds the disc stationary and yet the natural vertical movement of the fender with respect to the wheel will have but little effect in rocking said disc I am aware of the fact advertising display discs have been mounted on wheel hubs in such manner that the wheel may revolve without the revolution of the disc, one of the methods being to secure a weight to the disc with the idea that the zone having such weight will act to overcome the friction at the point of support of the disc. This, however, has been found to be unsatisfactory since the disc cannot be prevented from swinging after the manner of a pendulum due to jolts and jars and changing speeds of travel on the road making the display matter difficult to read or to keep the eye upon.

In another form it was proposed to prevent the disc rotating or having swinging movement by connecting to it a rigid member which member was to be attached to a part of the vehicle body. Now, since the body of the vehicle always has movement with respect to the wheel in a vertical direction it is not possible to make such attachment by means of a rigid connecting member.

In my device, however, I employ the coil spring 26 as described which holds the disc practically stationary and although the body of the vehicle may have movement relatively to the wheel vertically the spring conforms to the changing conditions.

An effective device for the wheels of a vehicle is provided that will stand up under long use. An advantage among others is that the parts may be easily and quickly installed or removed.

I claim:

In an advertising display device, the combination with the hub cap of the wheel of a vehicle, and a part extending from the body of the vehicle, of a disc or plate journaled on the cap, the same adapted for carrying advertising display matter, and a coil spring connected at its ends to the plate and said part, said spring being disposed whereby the line of its pull lies substantially parallel with the road surface.

In testimony whereof I affix my signature.

HARRY A. HAMILTON.